Oct. 28, 1941.                S. BEE                2,260,768
TOY BANK
Filed Sept. 17, 1941
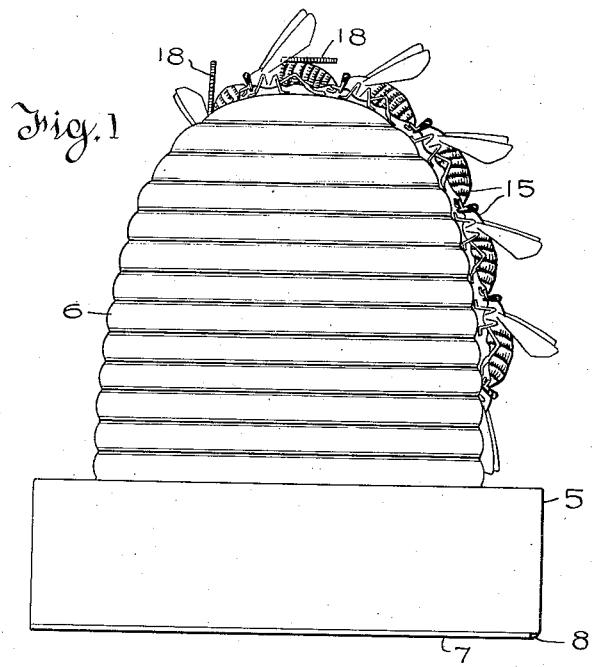
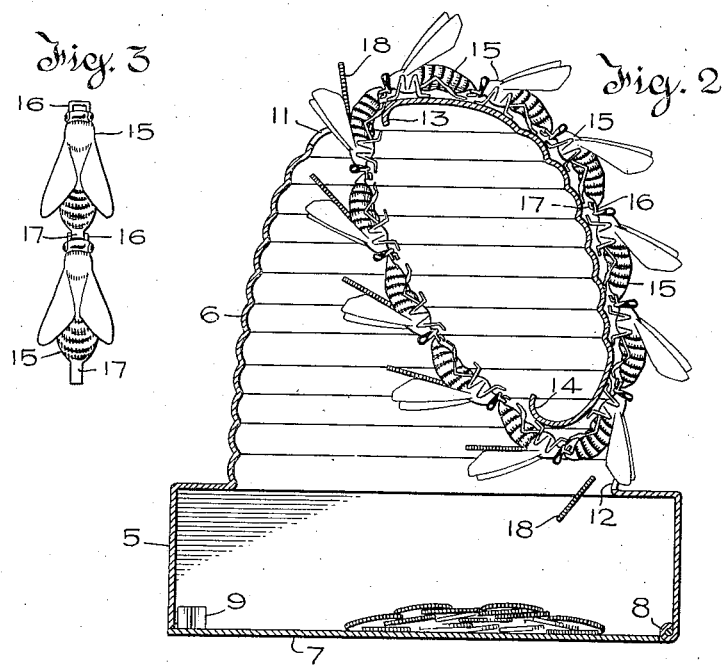
Inventor
Sophie Bee
By
Attorneys Patented Oct. 28, 1941

2,260,768

UNITED STATES PATENT OFFICE 2,260,768

TOY BANK

Sophie Bee, Edgewater, N. J.

Application September 17, 1941, Serial No. 411,225

3 Claims. (Cl. 46—4)

This invention relates to a toy savings bank and particularly to a bank constructed and arranged to amuse children and to teach them habits of thrift.

The primary object of the invention is a bank which utilizes the busy bee as a symbol of thrift and brings the bee and his activity to attention each time a coin is inserted in the bank. Other objects will appear from the description.

One embodiment of the invention is illustrated in the drawing in which:

Figure 1 is a side elevation of one form of savings bank having a money conveyor in the form of an endless chain of bees;

Fig. 2 is a vertical sectional view showing the interior of the bank; and

Fig. 3 is a detail view of two of the bee-like figures showing the manner of assembling them in an endless chain.

The drawing illustrates a toy bank in the form of a beehive having a base 5 upon which a hive 6 is mounted. As shown in Fig. 2, the base and hive are constructed as a single unit of sheet metal. Obviously the invention is not limited to a one-piece structure nor to sheet metal. It may be made of molded plastic or any other suitable material.

The base 5 is hollow and in communication with the hollow interior of the hive. It forms a receptacle to receive coins which are deposited in it. The bottom is closed by a door 7, hinged at 8 and having a lock 9.

The hive 6 is made to simulate the usual beehive structure and has a corrugated wall of tapered form terminating in a rounded top. Instead of the usual single opening at the bottom of the hive, this hive has an entrance 11 near the top and an exit 12 at the bottom. These openings are of a size to accommodate a conveyor of bee-like figures which serve to convey money and to deposit it in the coin receptacle in the base. The openings 11 and 12 have inturned guide projections 13 and 14, respectively, for guiding the conveyor which will now be described.

The conveyor is made up of a plurality of bees 15 hooked together to form an endless chain which travels through the hive by way of the openings 11 and 12. Each bee carries a loop 16 on its nose and a hook 17 on the rear of its body. The hook of each bee is linked to the loop of another bee to form an endless chain as indicated in Fig. 2.

Each bee is constructed with a coin space on its back and under, or partially under its wings as indicated in Figs. 1 and 2. The arrangement is such that the coin 18 will stay in position when the body of the bee is horizontal or headed into the hive, but will fall out as the bee approaches an upside down position. For example, in Fig. 2 all of the bees within the hive carry coins while the bee just approaching the exit opening 12 has just dropped its coin. The construction is such that the conveyor may be moved easily, but a coin cannot be inserted without causing a bee to enter the hive. This is intended to convey to the mind of the child the idea that the bee must work in order to put money in the bank. The arrangement should, of course, be such that coins cannot be removed except by opening the door 7 at the bottom of the base.

In use, the child inserts a coin under the wings of the topmost bee adjacent the entrance 11 as indicated in Fig. 1, and then pushes it inwardly to actuate the conveyor. The coin will be held in position until its bee carrier approaches the exit, or roughly as indicated in Fig. 2, when the coin falls into the receptacle and the unloaded bee emerges. It will be obvious that with suitable explanation, preferably with the help of picture illustrations, even the smallest child may be taught habits of thrift by depositing coins in a bank of this character. The hive may be colored distinctively to convey a desired impression. If, for example, the money collected in the bank is to be used in the purchase of government bonds, for a particular patriotic purpose, the bank may be colored red, white and blue to emphasize the patriotic nature of the savings. Other ideas may be similarly emphasized.

What is claimed is:

1. A savings bank in the form of a beehive in which the hive has a plurality of openings, one adjacent the top and another adjacent the bottom; and an endless coin conveyor made up of bee-like figures arranged to receive and carry coins into the bank through one of said openings.

2. The combination with a savings bank in the form of a beehive, of a coin conveyor made up of bee-like figures arranged to receive coins and to convey them into the hive.

3. In combination, a savings bank in the form of a beehive having a coin space therein and an entrance and an exit leading to said space; and an endless conveyor connecting said entrance and exit and made up of a plurality of bee-like figures each constructed to receive a coin and convey it into the coin space through said entrance.

SOPHIE BEE.